US010631172B2

(12) United States Patent
Belghoul et al.

(10) Patent No.: US 10,631,172 B2
(45) Date of Patent: Apr. 21, 2020

(54) LICENSE ASSISTED ACCESS COMMUNICATION WITH DYNAMIC USE OF REQUEST-TO-SEND AND CLEAR-TO-SEND MESSAGES

(71) Applicant: Apple Inc., Cupertino, CA (US)

(72) Inventors: Farouk Belghoul, Campbell, CA (US); Lydi Smaini, San Jose, CA (US); Tarik Tabet, Los Gatos, CA (US); Syed Aon Mujtaba, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 269 days.

(21) Appl. No.: 15/584,507

(22) Filed: May 2, 2017

(65) Prior Publication Data

US 2018/0020359 A1    Jan. 18, 2018

Related U.S. Application Data

(60) Provisional application No. 62/361,856, filed on Jul. 13, 2016.

(51) Int. Cl.
*H04W 16/14* (2009.01)
*H04W 74/08* (2009.01)
(Continued)

(52) U.S. Cl.
CPC ........... *H04W 16/14* (2013.01); *H04L 5/0062* (2013.01); *H04L 27/0006* (2013.01);
(Continued)

(58) Field of Classification Search
CPC ............. H04W 16/14; H04W 72/0413; H04W 74/008; H04W 74/0816; H04W 74/085;
(Continued)

(56) References Cited

U.S. PATENT DOCUMENTS

2015/0319784 A1   11/2015  Bhushan et al.
2016/0353437 A1*  12/2016  Sun ................... H04W 74/0808
(Continued)

FOREIGN PATENT DOCUMENTS

WO    WO 2016/072908        5/2016

*Primary Examiner* — Hardikkumar D Patel
(74) *Attorney, Agent, or Firm* — Kowert Hood Munyon Rankin and Goetzel PC; Jeffrey C. Hood

(57) ABSTRACT

This disclosure relates to performing cellular communication in unlicensed spectrum in a manner that accounts for the possible existence of hidden nodes by opportunistically introducing the use of RTS and CTS messages. A listen-before-talk procedure may be performed to determine whether a wireless medium is available. When the listen-before-talk procedure is complete, an amount of time until a next possible start time for communicating in the cellular communication system according to a timing synchronization scheme for the cellular communication system may be determined. The wireless medium may be occupied until the next possible start time for communicating in the cellular communication system in a manner selected based at least in part on the amount of time until the next possible start time for communicating in the cellular communication system. Cellular communication may be performed on the wireless medium at the next possible start time for communicating in the cellular communication system.

20 Claims, 12 Drawing Sheets

(51) Int. Cl.
    *H04L 27/26*     (2006.01)
    *H04L 27/00*     (2006.01)
    *H04L 5/00*     (2006.01)
    *H04W 72/04*     (2009.01)
    *H04W 74/00*     (2009.01)
    *H04W 24/08*     (2009.01)
    *H04W 84/12*     (2009.01)

(52) U.S. Cl.
    CPC ......... *H04L 27/26* (2013.01); *H04W 72/0413* (2013.01); *H04W 74/008* (2013.01); *H04W 74/085* (2013.01); *H04W 74/0816* (2013.01); *H04W 74/0891* (2013.01); *H04L 5/001* (2013.01); *H04L 5/0023* (2013.01); *H04L 5/0053* (2013.01); *H04L 5/0082* (2013.01); *H04W 24/08* (2013.01); *H04W 84/12* (2013.01)

(58) Field of Classification Search
    CPC . H04W 74/0891; H04W 24/08; H04W 84/12; H04W 24/10; H04W 72/14; H04W 16/04; H04W 28/04; H04W 72/04; H04W 74/00; H04W 74/08; H04W 56/00; H04W 56/001; H04W 72/042; H04W 48/12; H04W 72/08; H04W 74/0808; H04L 5/0062; H04L 27/0006; H04L 27/26; H04L 5/001; H04L 5/0023; H04L 5/0053; H04L 5/0082; H04L 1/1816; H04L 1/18; H04L 5/0032; H04L 5/0048; H04L 5/0094

See application file for complete search history.

(56) References Cited

U.S. PATENT DOCUMENTS

2017/0048879 A1    2/2017    Zhang et al.
2017/0353912 A1\*  12/2017  Einhaus ................ H04W 48/12
2018/0175975 A1\*   6/2018  Um ....................... H04L 1/1816

\* cited by examiner

LICENSE ASSISTED ACCESS COMMUNICATION WITH DYNAMIC USE OF REQUEST-TO-SEND AND CLEAR-TO-SEND MESSAGES

PRIORITY INFORMATION

This application claims priority to U.S. provisional patent application Ser. No. 62/361,856, entitled "License Assisted Access Communication with Dynamic Use of Request-to-Send and Clear-to-Send Messages," filed Jul. 13, 2016, which is hereby incorporated by reference in its entirety as though fully and completely set forth herein.

FIELD OF THE INVENTION

The present application relates to wireless communications, and more particularly to systems, apparatuses, and methods for performing LAA communication with dynamic RTS/CTS use.

DESCRIPTION OF THE RELATED ART

Wireless communication systems are rapidly growing in usage. In recent years, wireless devices such as smart phones and tablet computers have become increasingly sophisticated. In addition to supporting telephone calls, many mobile devices (i.e., user equipment devices or UEs) now provide access to the internet, email, text messaging, and navigation using the global positioning system (GPS), and are capable of operating sophisticated applications that utilize these functionalities. Additionally, there exist numerous different wireless communication technologies and standards. Some examples of wireless communication standards include GSM, UMTS (associated with, for example, WCDMA or TD-SCDMA air interfaces), LTE, LTE Advanced (LTE-A), HSPA, 3GPP2 CDMA2000 (e.g., 1×RTT, 1×EV-DO, HRPD, eHRPD), IEEE 802.11 (WLAN or Wi-Fi), IEEE 802.16 (WiMAX), BLUETOOTH™, etc.

The ever increasing number of features and functionality introduced in wireless communication devices also creates a continuous need for improvement in both wireless communications and in wireless communication devices. In particular, it is important to ensure the accuracy of transmitted and received signals through user equipment (UE) devices, e.g., through wireless devices such as cellular phones, base stations and relay stations used in wireless cellular communications. In addition, increasing the functionality of a UE device can place a significant strain on the battery life of the UE device. Thus it is very important to also reduce power requirements in UE device designs while allowing the UE device to maintain good transmit and receive abilities for improved communications.

In addition to the communication standards mentioned above, there also exist extensions aimed at boosting transmission coverage in certain cellular networks. For example, LTE in Unlicensed spectrum (LTE-U) allows cellular carriers to boost coverage in their cellular networks by transmitting in the unlicensed 5 GHz band which is also used by many Wi-Fi devices. License Assisted Access (LAA) describes a similar technology aimed to standardize operation of LTE in the Wi-Fi bands through the use of a contention protocol referred to as listen-before-talk (LBT), which facilitates coexistence with other Wi-Fi devices on the same band. However, the coexistence of cellular and Wi-Fi communications in the same band can still result in the degradation of data throughput and/or decreased performance of streaming applications (data streaming) when both Wi-Fi signals and LAA/LTE-U signals are present.

SUMMARY OF THE INVENTION

Embodiments are presented herein of apparatuses, systems, and methods for handling the possible existence of hidden nodes when performing cellular communication in unlicensed spectrum, such as according to LTE-U or LAA.

When performing cellular communication in shared unlicensed spectrum, techniques for reducing the likelihood of collisions on the shared medium may improve the efficiency and effectiveness of communications on the shared medium. For example, wireless devices (e.g., including devices performing cellular communication) that wish to communicate on a shared wireless medium may commonly perform a listen-before-talk (LBT) procedure to avoid transmitting when another transmission can be detected on the medium. Since such a procedure can take an indeterminate amount of time (e.g., depending on the duration of any transmissions that occur while performing the LBT procedure), the timing at which the shared medium becomes available to a device performing a LBT procedure may be uncertain and unpredictable. For cellular communication systems that utilize a timing synchronization scheme, this may result in a gap between successful completion of a LBT procedure and the next possible start time for cellular communication according to the cellular communication system's timing synchronization scheme.

According to the techniques described herein, wireless devices operating in such a cellular communication system that utilizes unlicensed spectrum may make opportunistic use of this possible gap to implement further collision avoidance techniques, such as exchange of request-to-send (RTS)/clear-to-send (CTS) handshakes and/or transmission of CTS-to-self messages and/or sending a Wi-Fi preamble or a Wi-Fi NAV (e.g., indicating the duration of medium reservation), to further reduce the likelihood of collisions. For example, as the gap between successful completion of a LBT procedure and the next possible start time for cellular communication on the wireless medium may have a different length at different times, the wireless devices may perform RTS/CTS handshakes and/or transmit CTS-to-self or Wi-Fi preamble/NAV messages opportunistically, e.g., depending on the length of the gap. As one such possibility, a wireless device may perform a RTS/CTS handshake if the gap is sufficiently long for such a handshake, or may transmit a CTS-to-self message or a Wi-Fi preamble/NAV if the gap is insufficiently long for a RTS/CTS handshake but long enough for such a message, or may forego either technique if the gap is insufficiently long for either. The wireless device may transmit a reservation signal (e.g., cell-specific reference signals (CRS), noise, etc.) to maintain control of the wireless medium for any portion of the gap beyond what is used for the RTS/CTS handshake or CTS-to-self or Wi-Fi preamble/NAV message.

Such opportunistic use of RTS/CTS, CTS-to-self or Wi-Fi preamble/NAV techniques may improve the coexistence characteristics of a cellular communication system operating in unlicensed spectrum. For example, while LBT procedures may help reduce the likelihood of a collision between two nodes that can detect each other, the addition of RTS/CTS handshakes and CTS-to-self messages may help reduce the likelihood that a hidden node causes a collision more effectively than LBT procedures alone, at least according to some embodiments. As a further example, if wireless devices sharing the wireless medium can utilize duration information provided in the RTS/CTS handshakes and/or CTS-to-self messages to determine to enter a low power mode for the duration of the cellular communication (e.g., as part of their clear channel assessment process), this may improve the operating efficiency of such devices, at least according to some embodiments.

Note that the techniques described herein may be implemented in and/or used with a number of different types of devices, including but not limited to base stations, access points, cellular phones, portable media players, tablet computers, wearable devices, and various other computing devices.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

Figure 1:
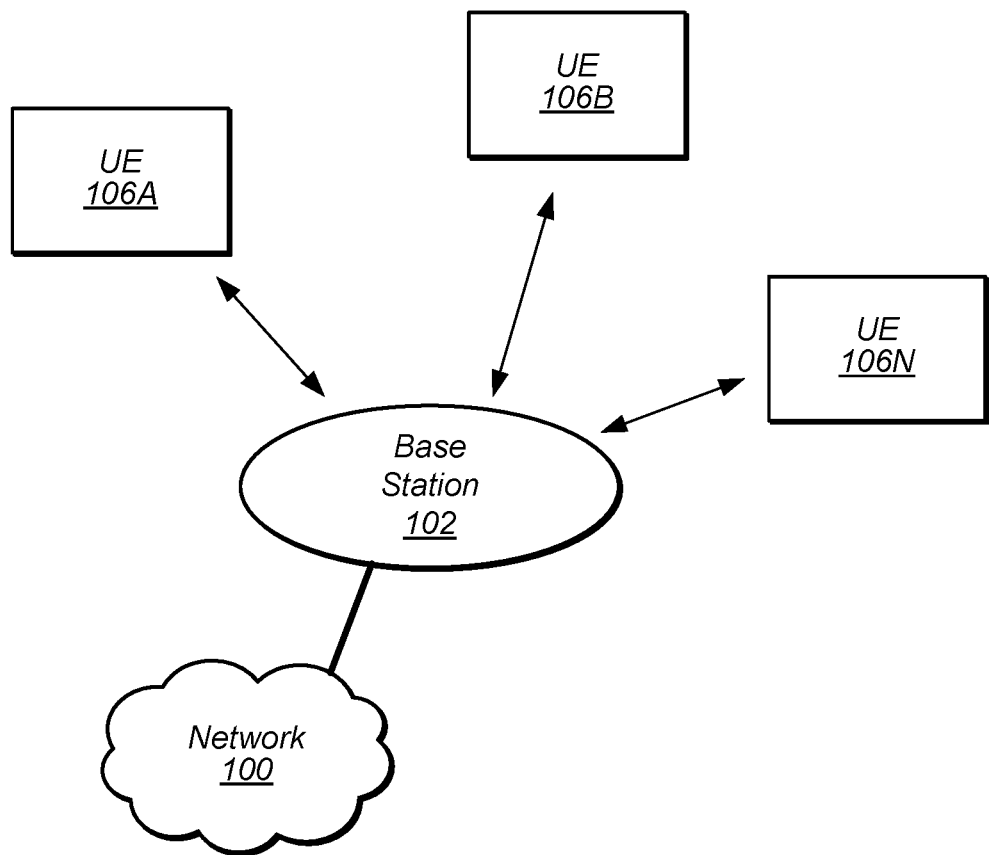
FIG. 1 illustrates an exemplary (and simplified) wireless communication system, according to some embodiments.

While features described herein are susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION OF THE EMBODIMENTS

Acronyms

Various acronyms are used throughout the present application. Definitions of the most prominently used acronyms that may appear throughout the present application are provided below:
UE: User Equipment
RF: Radio Frequency
BS: Base Station
GSM: Global System for Mobile Communication
UMTS: Universal Mobile Telecommunication System
LTE: Long Term Evolution
LTE-U: LTE-Unlicensed
LAA: Licensed Assisted Access
TDD: Time Division Duplex
FDD: Frequency Division Duplex
TX: Transmission/Transmit
RX: Reception/Receive
LAN: Local Area Network
WLAN: Wireless LAN
LBT: Listen-Before-Talk
AP: Access Point
RAT: Radio Access Technology
IEEE: Institute of Electrical and Electronics Engineers
Wi-Fi: Wireless Local Area Network (WLAN) RAT based on the IEEE 802.11 standards Terms The following is a glossary of terms that may appear in the present application:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may comprise other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer system for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Computer System (or Computer)—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" may be broadly defined to encompass any device (or combination of devices) having at least one processor that executes instructions from a memory medium.

User Equipment (UE) (or "UE Device")—any of various types of computer systems devices which are mobile or portable and which performs wireless communications. Examples of UE devices include mobile telephones or smart phones (e.g., iPhone™, Android™-based phones), tablet computers (e.g., iPad™, Samsung Galaxy™), portable gaming devices (e.g., Nintendo DS™, PlayStation Portable™, Gameboy Advance™, iPhone™), wearable devices (e.g., smart watch, smart glasses), laptops, PDAs, portable Internet devices, music players, data storage devices, or other handheld devices, etc. In general, the term "UE" or "UE device" can be broadly defined to encompass any electronic, computing, and/or telecommunications device (or combination of devices) which is easily transported by a user and capable of wireless communication.

Wireless Device—any of various types of computer system devices which performs wireless communications. A wireless device can be portable (or mobile) or may be stationary or fixed at a certain location. A UE is an example of a wireless device.

Communication Device—any of various types of computer systems or devices that perform communications, where the communications can be wired or wireless. A communication device can be portable (or mobile) or may be stationary or fixed at a certain location. A wireless device is an example of a communication device. A UE is another example of a communication device.

Base Station (BS)—The term "Base Station" has the full breadth of its ordinary meaning, and at least includes a wireless communication station installed at a fixed location and used to communicate as part of a wireless telephone system or radio system.

Processing Element—refers to various elements or combinations of elements that are capable of performing a function in a device, e.g. in a user equipment device or in a cellular network device. Processing elements may include, for example: processors and associated memory, portions or circuits of individual processor cores, entire processor cores, processor arrays, circuits such as an ASIC (Application Specific Integrated Circuit), programmable hardware elements such as a field programmable gate array (FPGA), as well any of various combinations of the above.

Wi-Fi—The term "Wi-Fi" has the full breadth of its ordinary meaning, and at least includes a wireless communication network or RAT that is serviced by wireless LAN (WLAN) access points and which provides connectivity through these access points to the Internet. Most modern Wi-Fi networks (or WLAN networks) are based on IEEE 802.11 standards and are marketed under the name "Wi-Fi". A Wi-Fi (WLAN) network is different from a cellular network.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Configured to—Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112, paragraph six, interpretation for that component.

Figure 2:
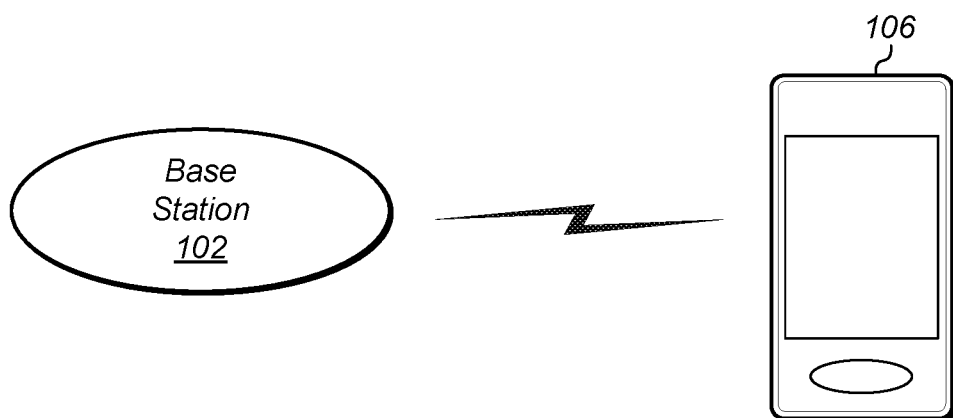
FIG. 2 illustrates an exemplary base station in communication with an exemplary wireless user equipment (UE) device, according to some embodiments.

FIGS. 1 and 2—Exemplary Communication System

FIG. 1 illustrates an exemplary (and simplified) wireless communication system in which aspects of this disclosure may be implemented, according to some embodiments. It is noted that the system of FIG. 1 is merely one example of a possible system, and embodiments may be implemented in any of various systems, as desired.

As shown, the exemplary wireless communication system includes a base station 102 which communicates over a transmission medium with one or more (e.g., an arbitrary number of) user devices 106A, 106B, etc. through 106N. Each of the user devices may be referred to herein as a "user equipment" (UE) or UE device. Thus, the user devices 106 are referred to as UEs or UE devices.

The base station 102 may be a base transceiver station (BTS) or cell site, and may include hardware and/or software that enables wireless communication with the UEs 106A through 106N. If the base station 102 is implemented in the context of LTE, it may alternately be referred to as an 'eNodeB'. The base station 102 may also be equipped to communicate with a network 100 (e.g., a core network of a cellular service provider, a telecommunication network such as a public switched telephone network (PSTN), and/or the Internet, among various possibilities). Thus, the base station 102 may facilitate communication among the user devices and/or between the user devices and the network 100. The communication area (or coverage area) of the base station may be referred to as a "cell." As also used herein, from the perspective of UEs, a base station may sometimes be considered as representing the network insofar as uplink and downlink communications of the UE are concerned. Thus, a UE communicating with one or more base stations in the network may also be interpreted as the UE communicating with the network.

The base station 102 and the user devices may be configured to communicate over the transmission medium using any of various radio access technologies (RATs), also referred to as wireless communication technologies, or telecommunication standards, such as GSM, UMTS (WCDMA), LTE, LTE-Advanced (LTE-A), NR, LAA/LTE-U, 3GPP2 CDMA2000 (e.g., 1×RTT, 1×EV-DO, HRPD, eHRPD), Wi-Fi, WiMAX etc.

Base station 102 and other similar base stations operating according to the same or a different cellular communication standard may thus be provided as one or more networks of cells, which may provide continuous or nearly continuous overlapping service to UE 106 and similar devices over a geographic area via one or more cellular communication standards.

Note that a UE 106 may be capable of communicating using multiple wireless communication standards. For example, a UE 106 might be configured to communicate using either or both of a 3GPP cellular communication standard (such as LTE) or a 3GPP2 cellular communication standard (such as a cellular communication standard in the CDMA2000 family of cellular communication standards). In some embodiments, the UE 106 may be configured to perform LAA/LTE-U communication in a manner that accounts for the possibility of hidden nodes, at least according to the various methods as described herein. The UE 106 might also or alternatively be configured to communicate using WLAN, BLUETOOTH™, one or more global navigational satellite systems (GNSS, e.g., GPS or GLONASS), one and/or more mobile television broadcasting standards (e.g., ATSC-M/H or DVB-H), etc. Other combinations of wireless communication standards (including more than two wireless communication standards) are also possible.

FIG. 2 illustrates an exemplary user equipment 106 (e.g., one of the devices 106A through 106N) in communication with the base station 102, according to some embodiments. The UE 106 may be a device with wireless network connectivity such as a mobile phone, a handheld device, a wearable device, a computer or a tablet, or virtually any type of wireless device. The UE 106 may include a processor that is configured to execute program instructions stored in memory. The UE 106 may perform any of the method embodiments described herein by executing such stored instructions. Alternatively, or in addition, the UE 106 may include a programmable hardware element such as an FPGA (field-programmable gate array) that is configured to perform any of the method embodiments described herein, or any portion of any of the method embodiments described herein. The UE 106 may be configured to communicate using any of multiple wireless communication protocols. For example, the UE 106 may be configured to communicate using two or more of CDMA2000, LTE, LTE-A, WLAN, or GNSS. Other combinations of wireless communication standards are also possible.

The UE 106 may include one or more antennas for communicating using one or more wireless communication protocols according to one or more RAT standards. In some embodiments, the UE 106 may share one or more parts of a receive chain and/or transmit chain between multiple wireless communication standards. The shared radio may include a single antenna, or may include multiple antennas (e.g., for MIMO) for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware.

In some embodiments, the UE 106 may include separate transmit and/or receive chains (e.g., including separate antennas and other radio components) for each wireless communication protocol with which it is configured to communicate. As a further possibility, the UE 106 may include one or more radios that are shared between multiple wireless communication protocols, and one or more radios that are used exclusively by a single wireless communication protocol. For example, the UE 106 may include a shared radio for communicating using either of LTE or CDMA2000 1×RTT (or LTE or GSM), and separate radios for communicating using each of Wi-Fi and BLUETOOTH™. Other configurations are also possible.

Figure 3:
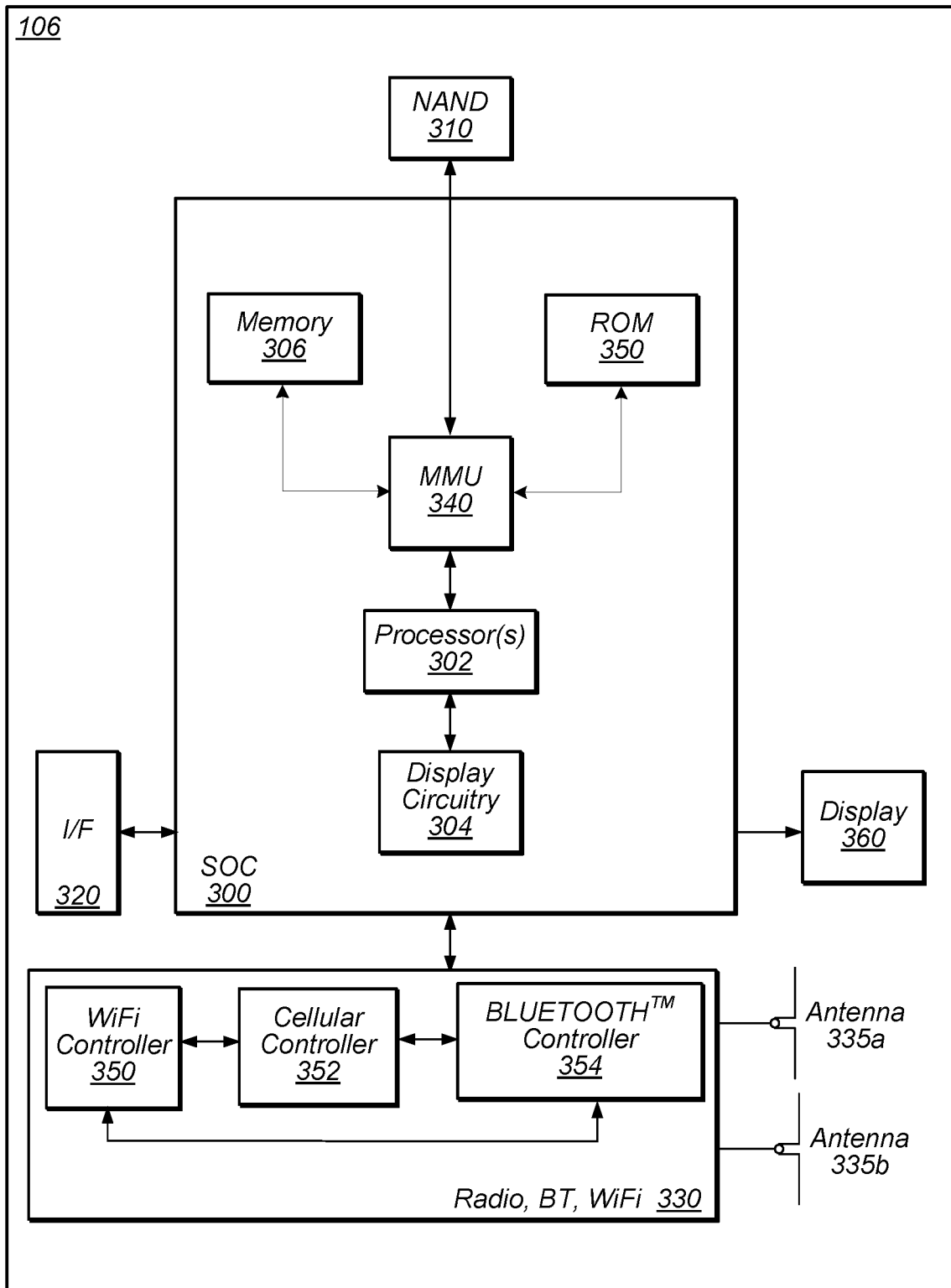
FIG. 3 illustrates an exemplary block diagram of a UE, according to some embodiments.

FIG. 3—Block Diagram of an Exemplary UE

FIG. 3 illustrates a block diagram of an exemplary UE 106, according to some embodiments. As shown, the UE 106 may include a system on chip (SOC) 300, which may include portions for various purposes. For example, as shown, the SOC 300 may include processor(s) 302 which may execute program instructions for the UE 106 and display circuitry 304 which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, radio 330, connector I/F 320, and/or display 360. The MMU 340 may be configured to perform memory protection and page table translation or set up. In some embodiments, the MMU 340 may be included as a portion of the processor(s) 302.

As shown, the SOC 300 may be coupled to various other circuits of the UE 106. For example, the UE 106 may include various types of memory (e.g., including NAND flash 310), a connector interface 320 (e.g., for coupling to the computer system), the display 360, and wireless communication circuitry 330 (e.g., for LTE, LTE-A, NR, CDMA2000, BLUETOOTH™, Wi-Fi, GPS, etc.). The UE device 106 may include at least one antenna (e.g. 335a), and possibly multiple antennas (e.g. illustrated by antennas 335a and 335b), for performing wireless communication with base stations and/or other devices. Antennas 335a and 335b are shown by way of example, and UE device 106 may include fewer or more antennas. Overall, the one or more antennas are collectively referred to as antenna 335. For example, the UE device 106 may use antenna 335 to perform the wireless communication with the aid of radio circuitry 330. As noted above, the UE may be configured to communicate wirelessly using multiple wireless communication standards in some embodiments.

As described further subsequently herein, the UE 106 (and/or base station 102) may include hardware and software components for implementing methods for at least UE 106 to perform LAA/LTE-U communication in a manner that accounts for the possible existence of hidden nodes. The processor(s) 302 of the UE device 106 may be configured to implement part or all of the methods described herein, e.g., by executing program instructions stored on a memory medium (e.g., a non-transitory computer-readable memory medium). In other embodiments, processor(s) 302 may be configured as a programmable hardware element, such as an FPGA (Field Programmable Gate Array), or as an ASIC (Application Specific Integrated Circuit). Furthermore, processor(s) 302 may be coupled to and/or may interoperate with other components as shown in FIG. 3, to implement LAA/LTE-U communications by UE 106 that account for the possible existence of hidden nodes according to various embodiments disclosed herein. Processor(s) 302 may also implement various other applications and/or end-user applications running on UE 106.

In some embodiments, radio 330 may include separate controllers dedicated to controlling communications for various respective RAT standards. For example, as shown in FIG. 3, radio 330 may include a Wi-Fi controller 350, a cellular controller (e.g. LTE controller) 352, and BLUETOOTH™ controller 354, and in at least some embodiments, one or more or all of these controllers may be implemented as respective integrated circuits (ICs or chips, for short) in communication with each other and with SOC 300 (and more specifically with processor(s) 302). For example, Wi-Fi controller 350 may communicate with cellular controller 352 over a cell-ISM link or WCI interface, and/or BLUETOOTH™ controller 354 may communicate with cellular controller 352 over a cell-ISM link, etc. While three separate controllers are illustrated within radio 330, other embodiments have fewer or more similar controllers for various different RATs that may be implemented in UE device 106.

Figure 4:
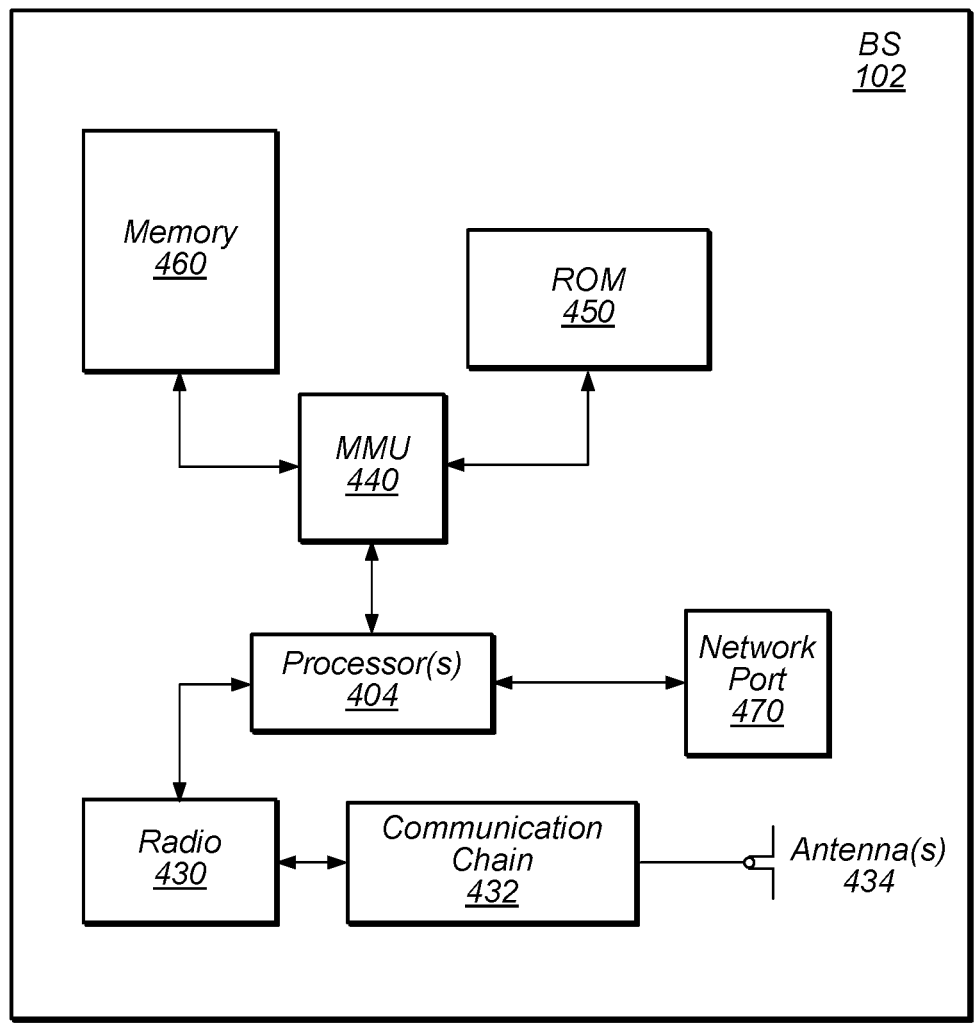
FIG. 4 illustrates an exemplary block diagram of a base station, according to some embodiments.

FIG. 4—Block Diagram of an Exemplary Base Station

FIG. 4 illustrates a block diagram of an exemplary base station 102, according to some embodiments. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106, access to the telephone network as described above in FIGS. 1 and 2. The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

The base station 102 may include at least one antenna 434, and possibly multiple antennas. The antenna(s) 434 may be configured to operate as a wireless transceiver and may be further configured to communicate with UE devices 106 via radio 430. The antenna(s) 434 communicates with the radio 430 via communication chain 432. Communication chain 432 may be a receive chain, a transmit chain or both. The radio 430 may be designed to communicate via various wireless telecommunication standards, including, but not limited to, LTE, LTE-A, NR, WCDMA, CDMA2000, etc. The processor 404 of the base station 102 may be configured to implement part or all of the methods described herein, e.g., by executing program instructions stored on a memory medium (e.g., a non-transitory computer-readable memory medium), for base station 102 to communicate with a UE device using LAA/LTE-U communication in a manner that accounts for the possible existence of hidden nodes. Alternatively, the processor 404 may be configured as a programmable hardware element, such as an FPGA (Field Programmable Gate Array), or as an ASIC (Application Specific Integrated Circuit), or a combination thereof. In the case of certain RATs, for example Wi-Fi, base station 102 may be designed as an access point (AP), in which case network port 470 may be implemented to provide access to a wide area network and/or local area network (s), e.g. it may include at least one Ethernet port, and radio 430 may be designed to communicate according to the Wi-Fi standard. Base station 102 may operate according to the various methods as disclosed herein for communicating with mobile devices using LAA/LTE-U in a manner that accounts for the possible existence of hidden nodes.

Figure 5:
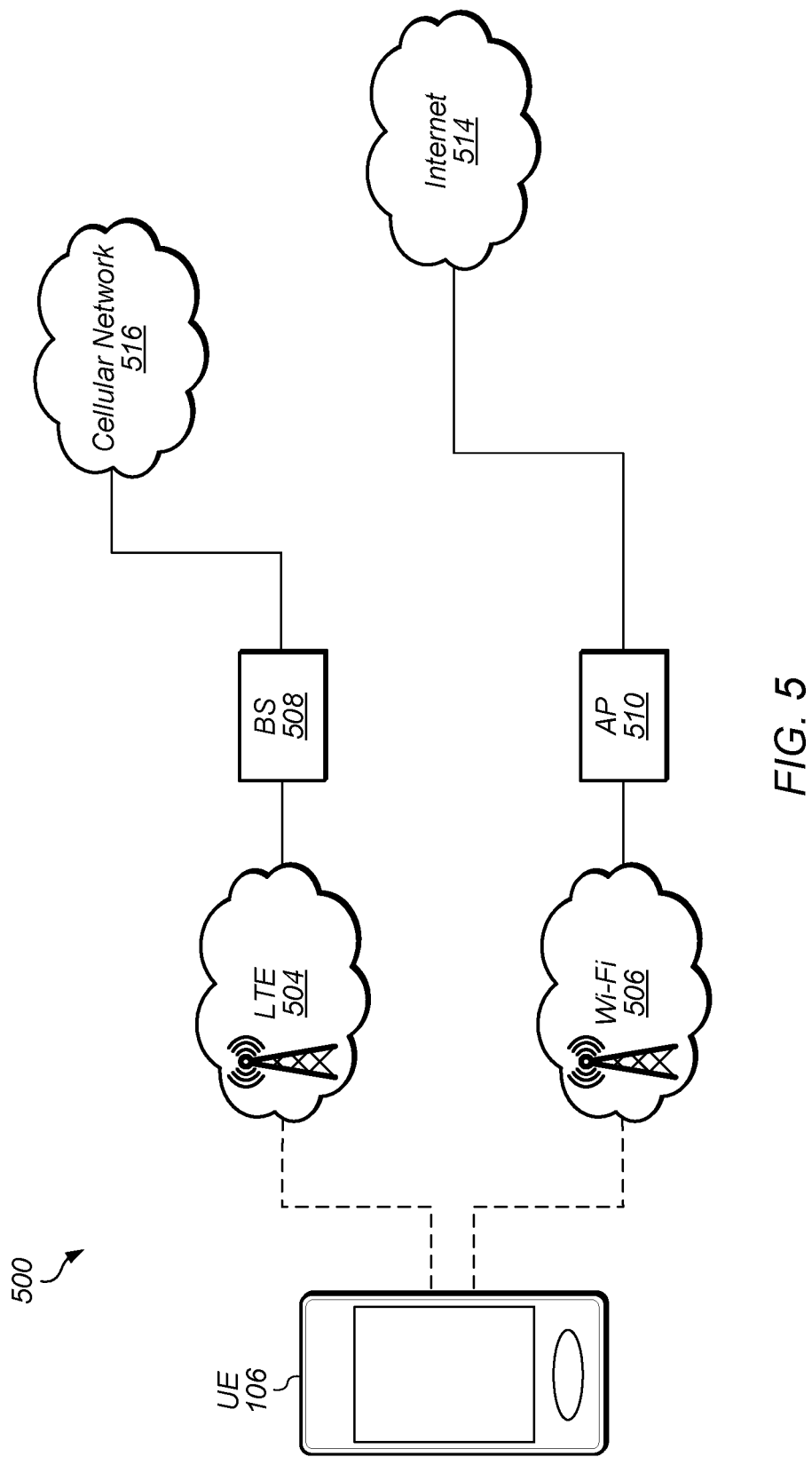
FIG. 5 illustrates an exemplary wireless communication system, according to some embodiments.

FIG. 5—Exemplary Communication System

FIG. 5 illustrates an exemplary wireless communication system 500 in which aspects of the present disclosure may be implemented, according to some embodiments. System 500 is a system in which an LTE access network and a Wi-Fi radio access network are implemented. The system 500 may include UE 106 and LTE network 504 and Wi-Fi network 506.

LTE access network 504 is representative of some embodiments of a first RAT access and Wi-Fi access network 506 is representative of some embodiments of a second RAT access. LTE access network 504 may be interfaced with a broader cellular network (e.g. LTE network) and Wi-Fi access network 506 may be interfaced with the Internet 514. More particularly, LTE access network 504 may be interfaced with a serving base station (BS) 508, which may in turn provide access to broader cellular network 516. The Wi-Fi access network 506 may be interfaced with an access point (AP), which may in turn provide access to the Internet 514. UE 106 may accordingly access Internet 514 via AP 510 and cellular network 516 via LTE access network 504. In some embodiments, though not shown, UE 106 may also access Internet 514 via LTE access network 504. More specifically, LTE access network 504 may be interfaced with a serving gateway, which may in turn be interfaced with a packet data network (PDN) gateway. The PDN gateway may, in turn, be interfaced with Internet 514. UE 106 may accordingly access Internet 514 via either or both of LTE access network 504 and Wi-Fi access network 506.

Figure 6:
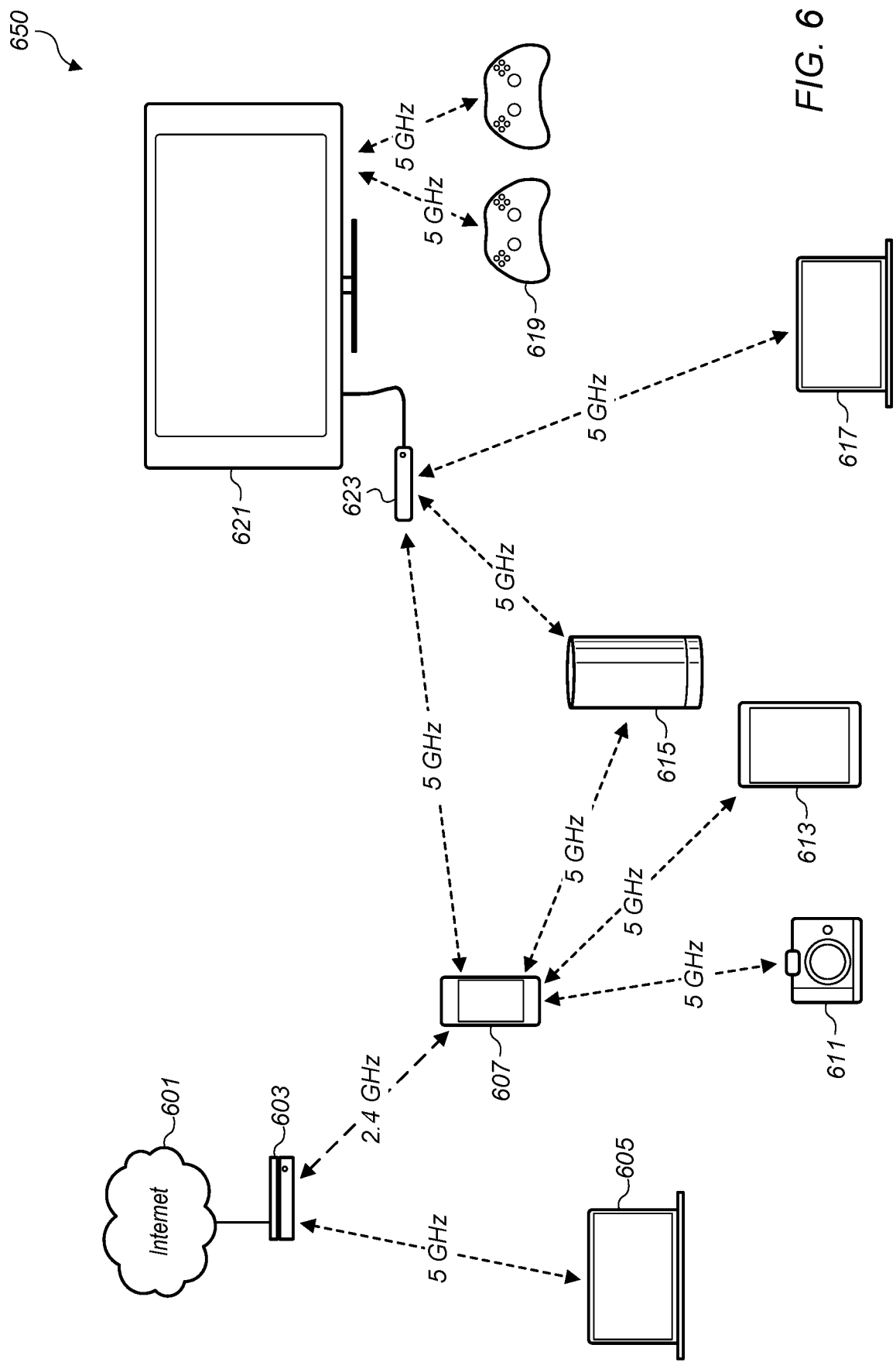
FIG. 6 illustrates an exemplary communication system in which multiple different devices may communicate with each other over a specific band, such as 2.4 GHz and/or 5 GHz frequency bands using Wi-Fi, according to some embodiments.

FIG. 6—Exemplary Communication System with Multiple Wi-Fi Devices

FIG. 6 shows an exemplary communication system 650 in which multiple different devices may communicate with each other over a specific band, such as 2.4 GHz and/or 5 GHz frequency bands using Wi-Fi RAT. 5 GHz Wi-Fi (e.g., IEEE 802.11 ac/n) capable devices have become quite common, operating in both peer-to-peer mode and/or infrastructure/station mode, as shown in FIG. 6. Data communications over a specific frequency band, e.g. over the 5 GHz band, may include voice, video, real time and best effort type of traffic. Illustrated devices include cameras (611), tablets (613), speakers (615), portable computers (605, 617), access ports/routers (603), game controllers (619), mobile devices such as smart phones (607), and smart monitors (621) or monitors with wireless access interface (621 together with media processing devices 623). As shown in FIG. 6, many of the devices may communicate with each other (and/or with the Internet 601, e.g., via access point 603) over the 5 GHz band, using Wi-Fi communication technology. In some cases the Wi-Fi communications conducted by the devices may be affected by LAA/LTE-U communications also taking place over the 5 GHz band.

Figure 7:
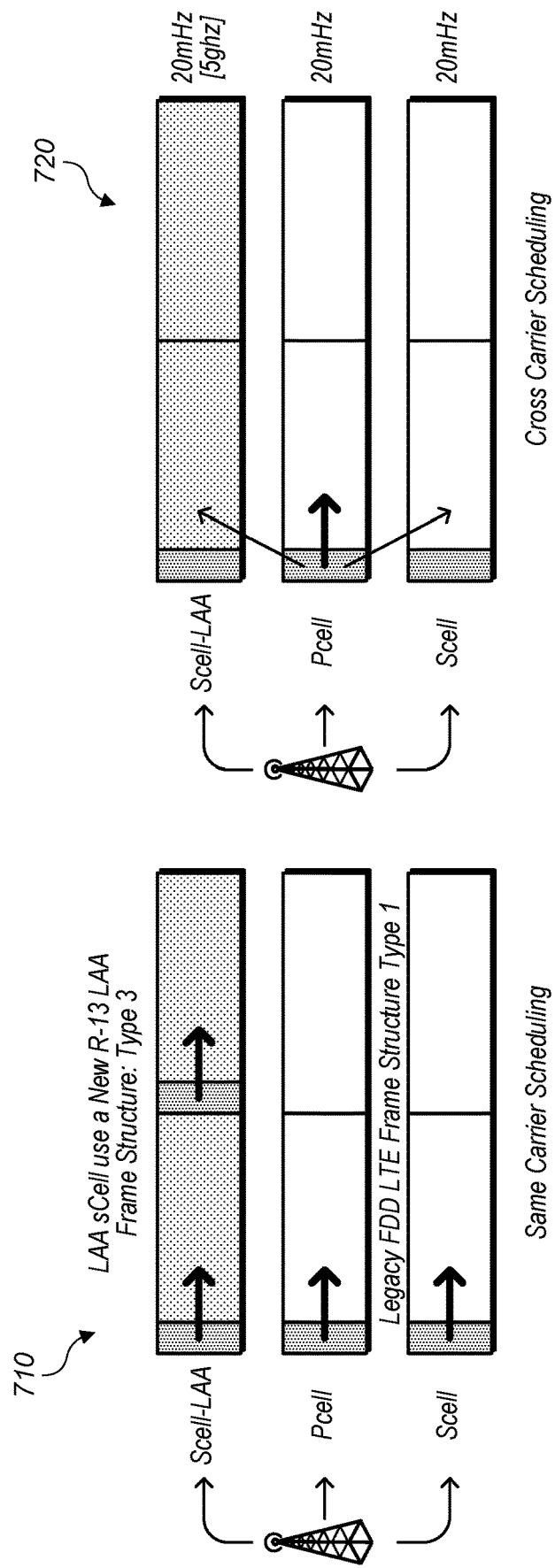
FIG. 7 illustrates exemplary aspects of LAA communication, according to some embodiments.

FIG. 7—LAA Structure Summary

In LTE, carrier aggregation (CA) refers to two or more component carriers (CCs) being aggregated in order to support wider transmission bandwidths, e.g., bandwidths of up to 100 MHz. A UE may simultaneously receive or transmit on one or multiple CCs depending on the UE's capabilities. When CA is configured, the UE may maintain one RRC connection with the network. The serving cell managing the UE's RRC connection is referred to as the Primary Cell (PCell), and Secondary Cells (SCells) together with the PCell may form a set of serving cells. In CA, a UE may be scheduled via PDCCH over multiple serving cells simultaneously. Cross-carrier scheduling with the Carrier Indicator Field (CIF) allows the PDCCH of a serving cell to schedule resources on another serving cell. That is, a UE receiving a downlink assignment on one CC may receive associated data on another CC.

LAA is a sub-category of LTE inter-band carrier aggregation, where one of the secondary carriers is operating in a 5 GHz unlicensed band, a band over which communications according to another RAT, such as Wi-Fi, may also be taking place. Resources in an LAA carrier may be scheduled in the same manner that resources are scheduled in legacy CA. That is, same carrier scheduling and/or cross layer scheduling may be used for scheduling LAA carriers, e.g., using the PDCCH or ePDCCH. An LAA Scell may operate in a frame structure 3 composed of 20 slots and may be accessed following a successful listen-before-talk (LBT) procedure, at least according to some embodiments. FIG. 7 shows an example of typical LAA control and data scheduling, providing an example for same carrier scheduling (710) (e.g., in which case control information for a SCell may be provided using PDCCH resources of the SCell) and an example for cross carrier scheduling (720) (e.g., in which case control information for a SCell may be provided using PDCCH resources of the PCell), assuming a successfully completed LBT procedure in the previous subframe. Note that according to some embodiments, if a start position of the RRC subframe indicates 's07', and no DCI is received in slot1, the UE may read the PDCCH/ePDCCH of slot2 to check downlink data availability.

Note that (e.g., depending on the applicable standard version and/or implementation choices), LAA may be used for downlink communication and/or uplink communication. For example, according to some embodiments, LAA release 13 may include standard specification details for using a SCell for downlink transmissions, while LAA release 14 may include standard specification details for using a SCell for both downlink and uplink transmissions.

Figure 8:
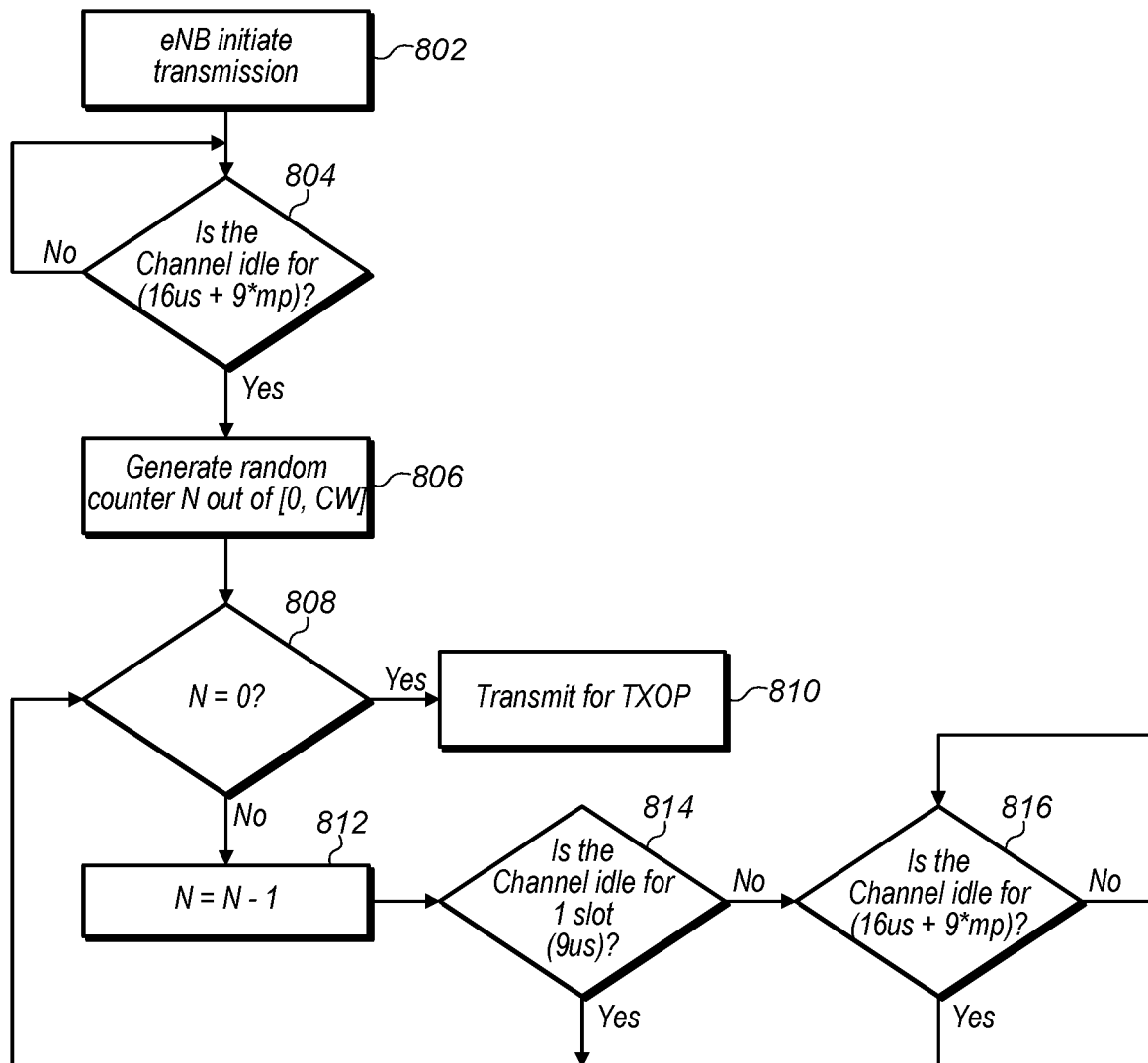
FIG. 8 is a flowchart diagram illustrating exemplary possible LBT procedures, according to some embodiments.

FIG. 8—LBT Procedure

FIG. 8 shows an exemplary flowchart for a LBT procedure. Note that while the process shown in FIG. 8 represents one possible LBT procedure, any number of variations on or alternatives to the procedure of FIG. 8 are also possible. In general, a LBT procedure may be used to help avoid causing collisions on a shared wireless medium, by monitoring the wireless medium to determine if any transmissions are already ongoing, and refraining from transmitting if a transmission is determined to already be in progress.

As shown, in 802, initially a base station (e.g., indicated as an eNB in FIG. 8) may determine to initiate a downlink transmission using a shared wireless medium, such as the 5 GHz unlicensed band.

In 804, the eNB may monitor the wireless medium for availability, to determine whether the channel is idle for a predetermined period of time continuously. The length of time may depend on a type (e.g., priority level) of traffic to be transmitted. For example, different lengths of time may be used for some or all of voice, video, best effort, and background traffic, according to some embodiments. In the exemplary illustrated scenario of FIG. 8, the period of time may include a base length of 16 microseconds plus a variable length of 9 microseconds multiplied by a factor selected based on the traffic type. As an example, the period of time might be 43 μs (e.g., 16+9*3) for best effort traffic, according to some embodiments. Other values (and algorithms for determining values) for the predetermined period of time may also or alternatively be used, as desired.

If the wireless medium is not available for the predetermined period of time continuously (e.g., if the wireless medium is busy or becomes busy before the predetermined period of time expires), the eNB may continue to monitor the wireless medium until such a time as the wireless medium does become idle for the predetermined period of time continuously, at which time the method may proceed to step 806.

In 806, the eNB may generate a random counter N with a value within a specified contention window (CW) range, e.g., between 0 and a predetermined maximum possible value CW.

In 808, it may be determined if the counter N is equal to 0. If yes, the method may proceed to step 810, in which the eNB may proceed to transmit for its transmission opportunity. If the counter N is not equal to 0, the method may proceed to step 812, in which the counter N may be reduced by 1.

In 814, it may be determined if the wireless medium remains idle for 1 Wi-Fi slot (e.g., 9 μs). If no, the method may proceed to step 816, in which the eNB may again monitor the wireless medium for availability (e.g., in a similar manner as in step 804), to determine whether the channel is idle for the predetermined period of time continuously. The eNB may repeat this step as needed until the channel is idle for the predetermined period of time continuously.

If the result of step 814 or step 816 is yes, the method may return to step 808, in which it may be determined if the counter N is now equal to 0. As previously noted, once the counter N is equal to 0, the method may proceed to step 810, in which the eNB may proceed to transmit for its transmission opportunity. Otherwise, the method may repeat its countdown of the counter N when the wireless medium is idle according to the illustrated procedure.

Figure 9:
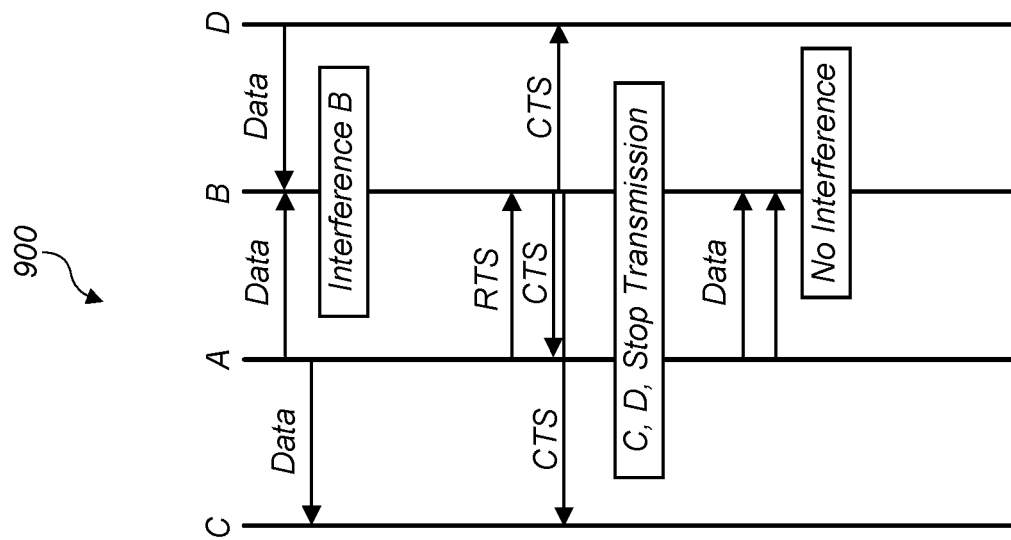
FIG. 9 illustrates an exemplary communication system with hidden nodes, according to some embodiments.
Figure 9:
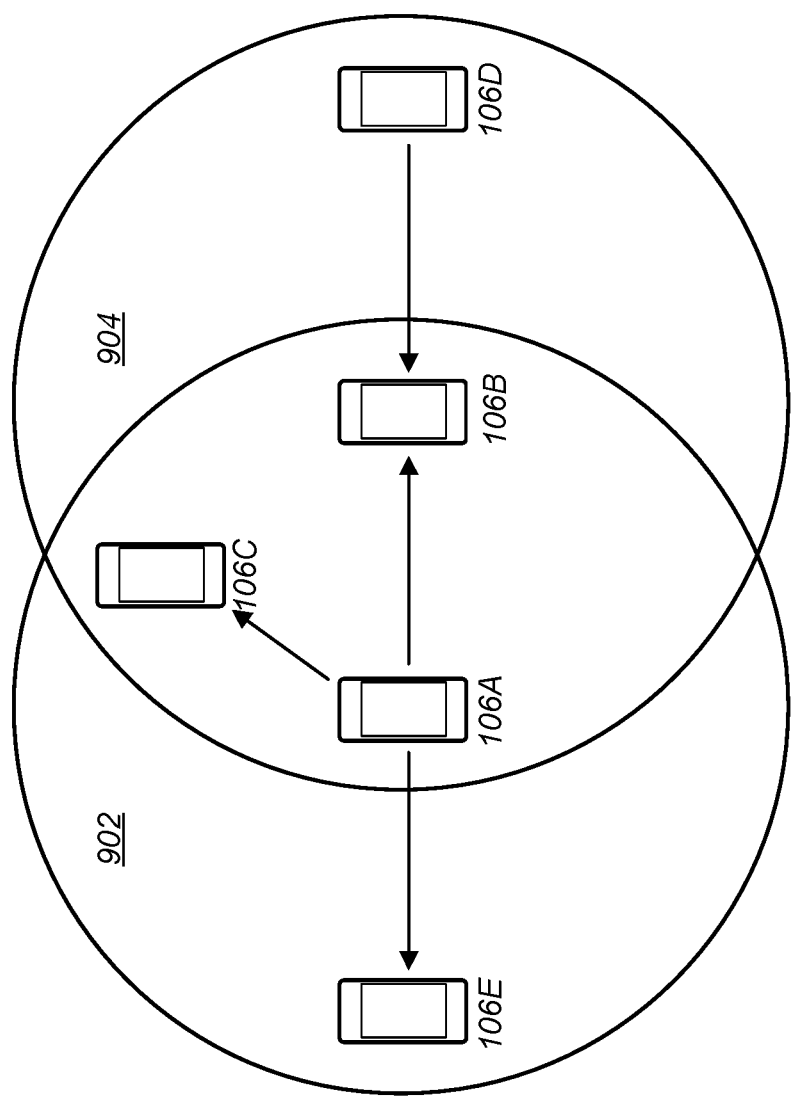

FIG. 9—Communication System with Hidden Nodes

FIG. 9 illustrates an exemplary possible wireless communication system 900 in which hidden nodes are present. As shown, several UE devices 106A, 106B, 106C, 106D, 106E may be in proximity to each other. However, not all of the UE devices 106 may be within communication range of each other. For example, as shown, UE device 106A may have a communication range 902 extending to UE 106B, UE 106C, and UE 106E, but may not be able to transmit to and/or receive from UE 106D. Similarly, UE device 106B may have a communication range 904 extending to UE 106A, UE 106C, and UE 106D, but may not be able to transmit to and/or receive from UE 106E.

In such a scenario, e.g., in which UE 106D is a hidden node to UE 106A (and possibly vice versa), it may be possible for a collision in the wireless medium to occur if, for example, both UE 106A and UE 106D want to transmit data to UE 106B. This may in turn result in interference occurring at the UE 106B, such that the UE 106B may not be able to successfully decode either transmission, effectively wasting time, power, and wireless medium resources.

Scenarios such as this, and variations thereon, may be illustrative of what is commonly referred to as the "hidden node problem". The hidden node problem may occur both when the wireless medium is used homogenously (e.g., by devices all using the same communication technology) and when the wireless medium experiences mixed use (e.g., by devices using multiple different communication technologies). For example, in some embodiments, the wireless communication system 900 may represent a system in which the wireless medium used includes mixed unlicensed spectrum. In this case, the UE devices 106A-E may include any combination of LAA/LTE devices, Wi-Fi stations, APs, and/or other devices using the shared spectrum. Accordingly, in such a scenario, the hidden node problem could occur between any combination of LAA/LTE-U and Wi-Fi stations and APs.

One way to potentially reduce the number and/or severity of such collisions that occur due to undetected hidden nodes may include the use of request-to-send (RTS) and clear-to-send (CTS) messages. For example, if the UE 106A were to transmit a RTS message to UE 106B, and the UE 106B were to respond with a CTS message that could be detected by the UE 106D (and potentially other nodes that might not be able to detect the RTS message transmitted by UE 106A), the UE 106D may refrain from transmitting while the UE 106A is transmitting to UE 106B, thereby preventing the potential collision and resulting interference. For example, LAA communication techniques that utilize RTS/CTS messages dynamically and opportunistically (such as those described further herein with respect to FIG. 10) could be used in conjunction with the communication system 900 to reduce collisions and interference in a mixed unlicensed spectrum scenario.

Note that RTS and CTS messages may, in addition to helping prevent potential collisions and resulting interference, help improve the management of power consumption and clear channel assessment (CCA)/enhanced CCA (eCCA) process. For example, according to some embodiments, an RTS frame may include five fields, including frame control, duration, receiver address, transmitter address, and a frame check sequence. Similarly, according to some embodiments, a CTS frame may include four fields, including frame control, duration, receiver address, and a frame check sequence. The duration and intended recipient information may be used to allow a receiver that is not the intended recipient to put its RF into a lower power mode (e.g., to sleep) during the duration of the this communication, and to integrate this duration of idle mode into its CCA/eCCA procedure.

Figure 10:
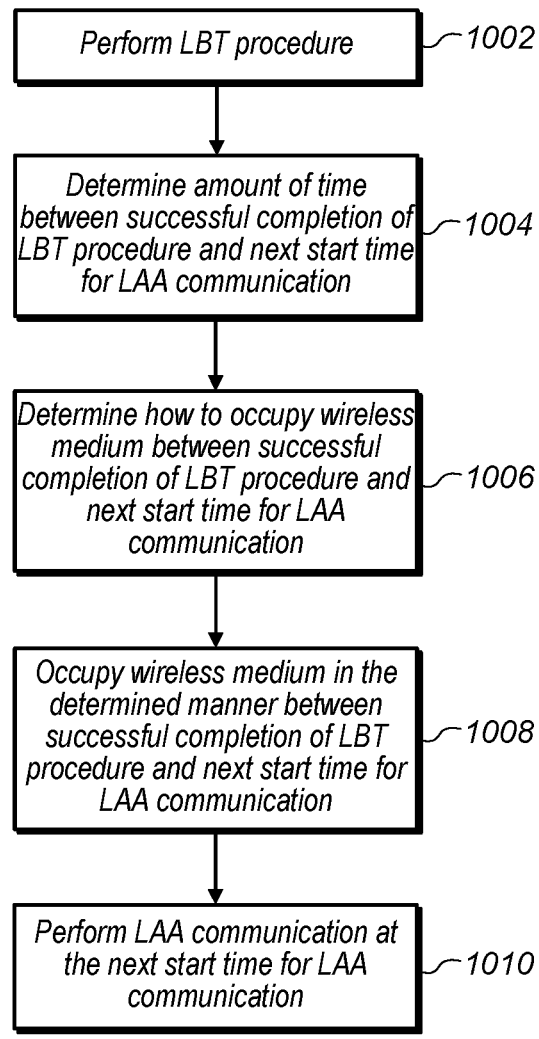
FIG. 10 is a flowchart diagram illustrating an exemplary method for performing LAA communication with dynamic RTS/CTS use, according to some embodiments.

FIG. 10—LAA Communication with Dynamic RTS/CTS Use

LAA today has no native solution for hidden nodes, and more generally provides limited features for assisting Wi-Fi nodes sharing the wireless medium to reduce power consumption. Accordingly, integrating the use of RTS/CTS into LAA communication techniques may mitigate potential problems caused by hidden nodes, improve the power consumption profiles of nearby Wi-Fi and LAA devices, and more generally improve coexistence between such devices. FIG. 10 is a flowchart diagram illustrating such a method for a wireless device (e.g., a cellular base station or wireless user equipment (UE) device) to perform LAA communication in a manner that opportunistically introduces the use of RTS and CTS messages, according to some embodiments.

Aspects of the method of FIG. 10 may be implemented by a cellular base station, such as a BS 102 illustrated in and described with respect to various of the Figures herein, or more generally in conjunction with any of the computer systems or devices shown in the above Figures, among other devices, as desired. Note that while at least some elements of the method of FIG. 10 are described in a manner relating to the use of communication techniques and/or features associated with LAA and/or 3GPP specification documents, such description is not intended to be limiting to the disclosure, and aspects of the method of FIG. 10 may be used in any suitable wireless communication system, as desired. In various embodiments, some of the elements of the methods shown may be performed concurrently, in a different order than shown, may be substituted for by other method elements, or may be omitted. Additional method elements may also be performed as desired. As shown, the method may operate as follows.

In 1002, a listen-before-talk (LBT) procedure may be performed by a wireless device to determine whether a wireless medium is available. The wireless device may be performing the LBT procedure to ensure the wireless medium is available for a LAA communication (or another cellular communication technique for communicating using unlicensed spectrum), according to some embodiments. For example, the wireless device may be a base station providing a SCell on the wireless medium, which may be a channel in the 5 GHz unlicensed band or any other desired wireless medium that is shared with other wireless devices that communicate independently of the network operator that controls the base station.

The LBT procedure may operate in a similar manner as illustrated and described with respect to FIG. 8, or in another manner, as desired. The LBT procedure may include monitoring the wireless medium to determine if any transmissions are already ongoing, for example by detecting signal strength levels on the wireless medium above a certain threshold considered to be indicative of an ongoing transmission, by detecting cyclic signal patterns associated with preamble/prefix signals intended to indicate the presence of a transmission, and/or other by performing other transmission detection techniques. The LBT procedure may further include refraining from transmitting if a transmission is determined to already be in progress, and may be used to help reduce the number of collision occurrences on the wireless medium. According to some embodiments (e.g., according to the exemplary procedure of FIG. 8), the LBT procedure may require the wireless medium to be clear for at least a minimum length of time before being considered successful.

Once the LBT procedure is successful, the wireless device may utilize the wireless medium for wireless communication. For some wireless communication techniques, such as Wi-Fi, it may be possible to immediately begin a data transmission upon successful LBT completion. However, for other wireless communication techniques, such as many cellular communication technologies (e.g., including LTE-LAA), a timing synchronization scheme that bounds possible data communication windows may be used. For example, as previously noted, LTE-LAA communication may in some instances include a frame structure in which each frame includes 10 subframes, each in turn including 2 timeslots, for a total of 20 slots in each radio frame. In such a scenario, it may be the case that for synchronization reasons, LAA communication may begin only at slot boundaries (or possibly even only at subframe boundaries), at least according to some embodiments.

As the LBT procedure may begin at any time and may have an indeterminate length (e.g., as its successful completion may depend on wireless medium usage or lack thereof by other wireless devices during the LBT procedure), it may commonly occur that there may be a gap between successful completion of the LBT procedure and the next possible start time for LAA communication by the wireless device. As the wireless medium may be used by another wireless device if not occupied during this gap, the wireless device may occupy the wireless medium in one manner or another during this time period, e.g., in order to effectively reserve the wireless medium until it can be used for the LAA communication.

In 1004, the amount of time between successful completion of the LBT procedure and the next possible start time for LAA communication (e.g., the next subframe or possibly slot) may be determined. In other words, the wireless device may calculate how long the gap between when it can control the wireless medium as a result of its successful LBT procedure and when it can utilize the wireless medium for LAA communication.

In 1006, the wireless device may determine the manner in which it will occupy the wireless medium between the successful completion of the LBT procedure and the next possible start time for LAA communication. The manner of occupying the wireless medium may include transmitting a 'reservation signal' that may include noise, cell-specific reference signals (CRS), and/or any other desired type of signal that may be detected as occupying the wireless medium by other wireless devices within communication range of the wireless device.

According to some embodiments, the manner in which the wireless medium is occupied may be determined based at least in part on the amount of time between the successful completion of the LBT procedure and the next possible start time for LAA communication on the wireless medium. As one possibility, the time between finishing LBT and beginning LAA communication may be used to help mitigate potential interference caused by hidden nodes in an opportunistic manner. For example, according to some embodiments, the time between finishing LBT and beginning LAA communication may be used for a RTS/CTS handshake if there is sufficient time for such a handshake, or may be used to transmit a CTS-to-self message if there is sufficient time for such a signal but insufficient time for a RTS/CTS handshake.

According to some embodiments, the manner in which the wireless medium is occupied may be determined further based at least in part on whether an intended recipient of the LAA communication supports RTS/CTS handshakes (e.g., is capable of CTS signaling). For example, in order for the wireless device to initiate a RTS/CTS handshake during the gap between completing LBT and beginning LAA communication, it may be important that the intended recipient be able to support RTS/CTS signaling, e.g., in order to be able to respond to a RTS message with a CTS message. Supporting such signaling may include being able to recognize that it is the intended recipient indicated in the RTS message, and immediately (i.e., following a short interframe space) respond with a CTS. The CTS may potentially be transmitted by a LAA transmission front end using the LAA channel (e.g., after which the front end may be switched back to receiving mode in order to receive the physical downlink control channel (PDCCH) and/or physical downlink shared channel (PDSCH)). Alternatively (e.g., if the intended recipient does not have an LAA transmission front end, such as if it is configured for LAA downlink only), the intended recipient may use a Wi-Fi interface to transmit the CTS message in the LAA channel (or possibly in a closely corresponding Wi-Fi channel). A real-time coexistence interface (e.g., between a Wi-Fi module and a LAA module) may be leveraged to trigger this Wi-Fi transmission of a CTS message after receiving an RTS message using a LAA interface. Accordingly, at least in some instances, the wireless device may also determine whether the intended recipient of the LAA communication supports RTS/CTS handshakes.

In such a scenario, as an alternative example, the time between finishing LBT and beginning LAA communication may be used to transmit a CTS-to-self message if there is sufficient time for such a signal even if there is also sufficient time for a RTS/CTS handshake, e.g., if the intended recipient of the LAA communication is not configured (or is not known to be configured) to respond with a CTS message as part of a RTS/CTS handshake, if desired. Alternatively or in addition to use of a CTS-to-self message, the time between finishing LBT and beginning LAA communication may be used to transmit just a Wi-Fi preamble, e.g., including the PHY header indicating the duration of the transmission and potentially not requiring media access control (MAC) header decoding as may be the case with RTS/CTS messages, or other Wi-Fi based signaling to indicate the network allocation vector (NAV)/duration of the transmission.

According to some embodiments, the time between finishing LBT and beginning LAA communication may simply be occupied by a reservation signal that does not include an RTS or CTS message or Wi-Fi preamble/NAV if there is insufficient time for either a RTS/CTS handshake or a CTS-to-self message or Wi-Fi preamble/NAV. Alternatively, if there is insufficient time for a RTS/CTS handshake (or possibly if there is insufficient time for a CTS-to-self or Wi-Fi preamble/NAV message) between finishing LBT and the next possible start time for LAA communication, the wireless device may delay the LAA communication until the subsequent possible start time for LAA communication, and may perform a RTS/CTS handshake (or provide a CTS-to-self or Wi-Fi preamble/NAV message) using the additional time from delaying the LAA communication.

The relative frequency, in aggregate, with which a RTS/CTS handshake is performed, a CTS-to-self message or a Wi-Fi preamble/NAV is transmitted, or neither of these occurs during gaps between finishing LBT and beginning LAA communication may depend at least in part on the typical lengths of time needed to perform a RTS/CTS handshake and to transmit a CTS-to-self or Wi-Fi preamble/NAV message, and the length of time between LAA communication opportunities. However, at least according to some embodiments, these variables may function together such that it may be possible to perform a RTS/CTS handshake on a majority (and possibly even a large majority) of occasions. For example, as one possibility, consider a scenario in which LAA communication may begin at each slot, which may in this scenario occur every 500 µs, and in which a full preamble/RTS/SIFS/Preamble/CTS exchange may typically take approximately 100-150 µs. Under the assumption that the LBT procedure may complete with any number of microseconds between 0 and 500 remaining until the next slot with equal probability, there may be at least a 70% chance that there will be sufficient time to perform a RTS/CTS handshake before the next slot begins in this scenario. This likelihood may rise to at least 85% if LAA communication may begin at each subframe, which may for example occur every 1 ms. As will be recognized, other lengths of time for RTS/CTS handshakes and CTS-to-self messages, and other intervals between LAA communication opportunities, along with associated likelihoods that there will be sufficient time to perform a RTS/CTS handshake or CTS-to-self after completing an LBT procedure and before the next LAA communication opportunity begins, are also possible.

In 1008, the wireless medium may be occupied between the successful completion of the LBT procedure and the next possible start time for LAA communication in the determined manner. For example, at least according to some embodiments, if the amount of time between successful completion of the LBT procedure and the next possible start time for LAA communication is at least equal to an amount of time to transmit a request-to-send (RTS) message and receive a clear-to-send (CTS) message with an interframe space between, the wireless device may transmit a RTS message and receive a CTS message (e.g., from an intended recipient of the LAA communication) in response to the RTS message. Additionally, if the amount of time between successful completion of the LBT procedure and the next possible start time for LAA communication is greater than the amount of time to transmit a RTS message and receive a CTS message with an interframe space between, the wireless device may further transmit a reservation signal until the amount of time remaining until the next possible start time for LAA communication is equal to the amount of time to transmit a RTS message and receive a CTS message with an interframe space between.

If the amount of time between successful completion of the LBT procedure and the next possible start time for LAA communication is less than the amount of time to transmit a RTS message and receive a CTS message with an interframe space between, but at least equal to an amount of time to transmit a CTS-to-self message (or possibly an amount of time to transmit a Wi-Fi preamble/NAV message), the wireless device may transmit a CTS-to-self message (or a Wi-Fi preamble/NAV message). Additionally, if the amount of time between successful completion of the LBT procedure and the next possible start time for LAA communication is less than the amount of time to transmit a RTS message and receive a CTS message with an interframe space between, but greater than the amount of time to transmit a CTS-to-self message (or potentially a Wi-Fi preamble/NAV message), the wireless device may further transmit a reservation signal until the amount of time remaining until the next possible start time for LAA communication is equal to the amount of time to transmit a CTS-to-self message (or Wi-Fi preamble/NAV message).

If the amount of time between successful completion of the LBT procedure and the next possible start time for LAA communication is less than the amount of time to transmit a CTS-to-self message (or possibly a Wi-Fi preamble/NAV message), the wireless device may transmit a reservation signal (e.g., without performing a RTS/CTS handshake or transmitting a CTS-to-self or Wi-Fi preamble/NAV message) until the next possible start time for LAA communication.

In 1010, LAA communication may be performed on the wireless medium at the next possible start time for LAA communication. This may include transmitting data to one or more recipient devices using the PDSCH (and possibly transmitting signaling/control information using the PDCCH, e.g., if using same carrier scheduling) during one or more LAA subframes/timeslots.

Since the wireless device may have utilized the (e.g., potentially otherwise underutilized) gap between successful completion of the LBT procedure and the LAA communication to exchange RTS/CTS messages, the likelihood that a hidden node (i.e., with respect to the wireless device) attempts to perform a transmission during the LAA communication may be reduced, as the hidden node may be able to detect the CTS message transmitted by the intended recipient of the LAA communication even if the hidden node is unable to detect the RTS message or the LAA communication itself. Further, as transmission of the RTS and CTS messages may include Wi-Fi preambles, they may be more detectable to some nodes (e.g., that are able to detect the transmissions based on cyclic prefix even if they might not be able to detect the transmissions based on signal strength alone) than LAA communication. Notably, this benefit may apply even if the wireless device just transmits a CTS-to-self message or Wi-Fi preamble/NAV during this gap, and thus this may still reduce the chances that a collision will interfere with the LAA communication even if it may be less effective than a full RTS/CTS handshake, at least according to some embodiments.

Figure 11:
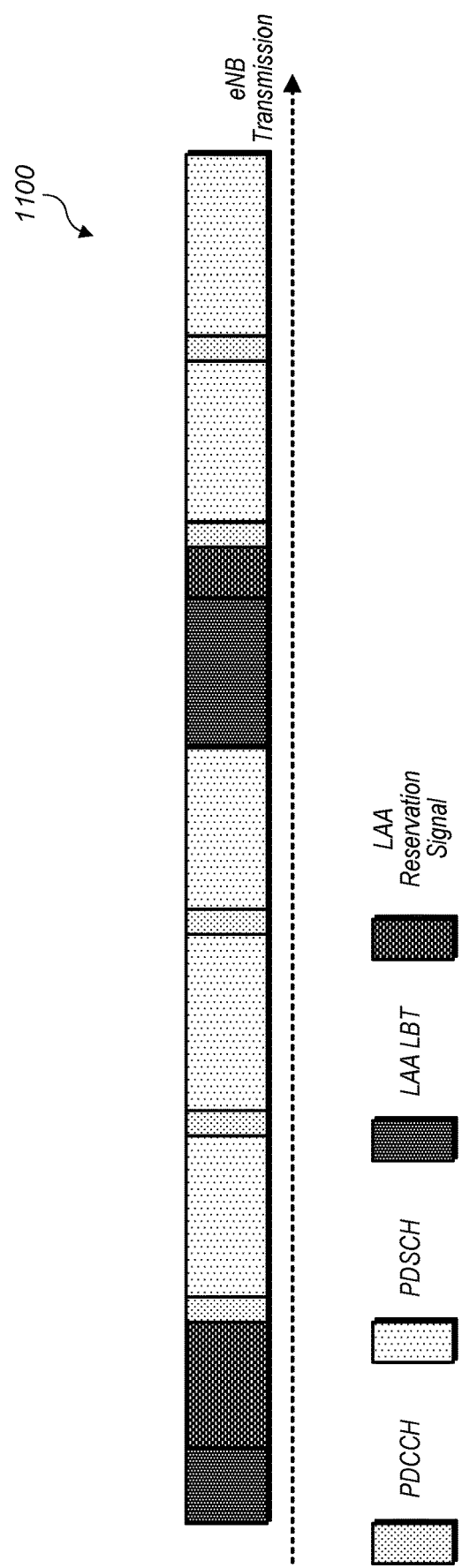
FIGS. 11-13 illustrate various possible LAA communication timelines according to which a wireless device may operate, according to some embodiments.
Figure 12:
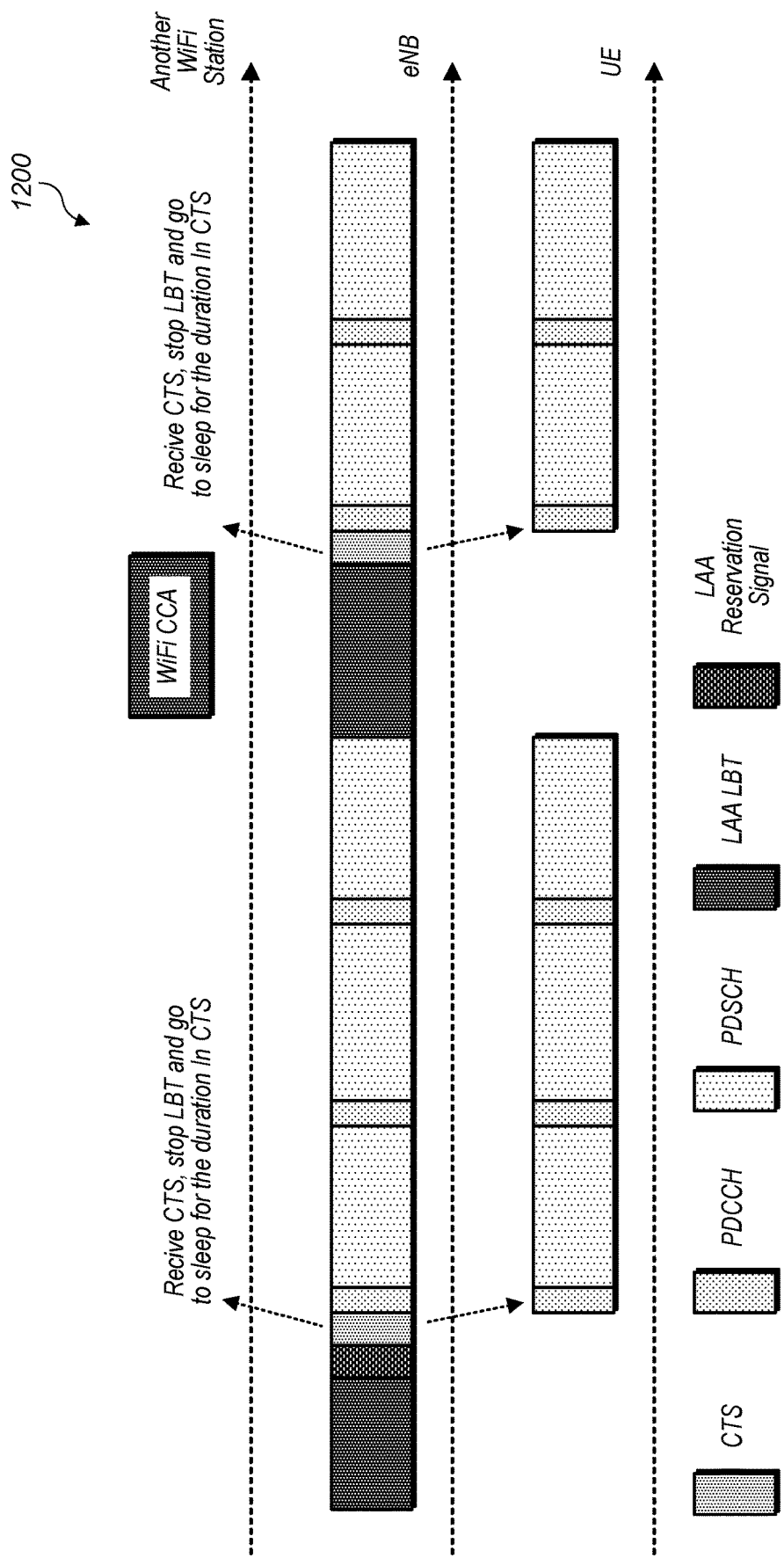
Figure 13:
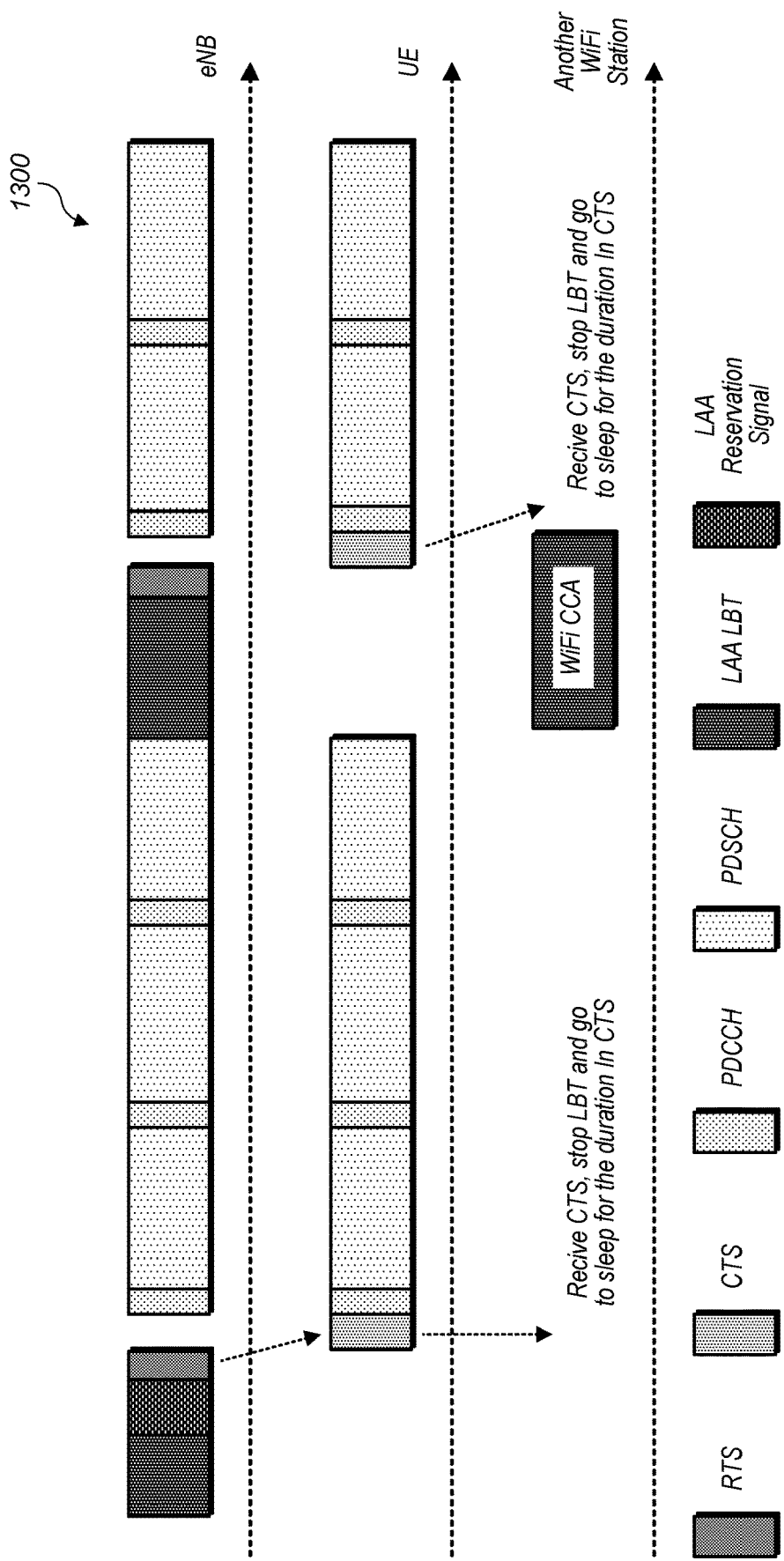

FIGS. 11-13—LAA Communication Timelines

FIGS. 11-13 illustrate various possible LAA communication timelines according to which a wireless device may operate, e.g., in conjunction with the method of FIG. 10. FIG. 11 illustrates an exemplary timeline 1100 in which the gap between LAA LBT is occupied by the wireless device (indicated as an eNB in the illustrated Figure) by transmitting an LAA reservation signal (e.g., noise, etc.) without any use of a RTS/CTS handshake or CTS-to-self. This timeline might be used, for example, if there is insufficient time between LAA LBT completion and the beginning of the PDCCH of the next LAA subframe for either a CTS-to-self message or a full RTS/CTS handshake.

FIG. 12 illustrates an exemplary timeline 1200 in which the wireless medium is occupied by an LAA reservation signal (e.g., noise, etc.) until the time remaining until the next LAA subframe is just sufficient to transmit a CTS-to-self, at which time the wireless device (indicated as an eNB in the illustrated Figure) may transmit a CTS-to-self. The intended recipient (indicated as a UE in the illustrated Figure) may receive the CTS-to-self and prepare for reception. Other wireless devices in range (represented as another Wi-Fi station in the illustrated Figure) may also receive the CTS-to-self, and may be able to determine to interrupt its current LBT procedure (e.g., if applicable) and sleep for the duration of the LAA communication (e.g., as indicated by the CTS-to-self). This timeline might be used, for example, if there is insufficient time between LAA LBT completion and the beginning of the PDCCH of the next LAA subframe for a full RTS/CTS handshake but is sufficiently long for a CTS-to-self to be transmitted.

FIG. 13 illustrates an exemplary timeline 1300 in which the wireless medium is occupied by an LAA reservation signal (e.g., noise, etc.) until the time remaining until the next LAA subframe is just sufficient for a RTS/CTS handshake, e.g., including the time for transmission of an RTS message (e.g., by the wireless device), a short interframe space (SIFS), and the time for transmission of a CTS message (e.g., by the intended recipient of the LAA communication), at which time the wireless device (indicated as an eNB in the illustrated Figure) may transmit a RTS message. The intended recipient (indicated as a UE in the illustrated Figure) may receive the RTS message, and after a SIFS, may respond with a CTS message. Other wireless devices in range (represented as another Wi-Fi station in the illustrated Figure) may also receive the CTS (and/or the RTS), and may be able to determine to interrupt its current LBT procedure (e.g., if applicable) and sleep for the duration of the LAA communication (e.g., as indicated by the RTS and CTS). This timeline might be used, for example, if there is sufficient time between LAA LBT completion and the beginning of the PDCCH of the next LAA subframe for a full RTS/CTS handshake.

In the following further exemplary embodiments are provided.

One set of embodiments may include an apparatus, comprising: a processing element configured to cause a wireless device to: perform a listen-before-talk (LBT) procedure to determine whether a wireless medium is available, wherein the wireless medium comprises unlicensed spectrum; determine, when the LBT procedure is complete, an amount of time until a next possible start time for communicating in a cellular communication system according to a timing synchronization scheme for the cellular communication system; occupy the wireless medium until the next possible start time for communicating in the cellular communication system in a manner selected based at least in part on the amount of time until the next possible start time for communicating in the cellular communication system; and perform cellular communication on the wireless medium at the next possible start time for communicating in the cellular communication system.

According to some embodiments, the wireless medium is occupied until the next possible start time for communicating in the cellular communication system by one or more of: a request-to-send (RTS)/clear-to-send (CTS) handshake procedure; a CTS-to-self message; a Wi-Fi preamble/NAV; or a reservation signal.

According to some embodiments, the wireless medium is occupied until the next possible start time for communicating in the cellular communication system by at least a RTS/CTS handshake procedure if the amount of time until the next possible start time for LAA communication is greater than an estimated amount of time to complete the RTS/CTS handshake procedure.

According to some embodiments, the wireless medium is occupied until the next possible start time for communicating in the cellular communication system by at least a CTS-to-self or Wi-Fi preamble/NAV message if the amount of time until the next possible start time for communicating in the cellular communication system is greater than an estimated amount of time to transmit the CTS-to-self or Wi-Fi preamble/NAV message and less than an estimated amount of time to complete a RTS/CTS handshake procedure.

According to some embodiments, the wireless medium is occupied until the next possible start time for communicating in the cellular communication system by a reservation signal and is not occupied by a RTS/CTS handshake procedure or CTS-to-self or Wi-Fi preamble/NAV message if the amount of time until the next possible start time for communicating in the cellular communication system is less than an estimated amount of time to complete the RTS/CTS handshake procedure or transmit the CTS-to-self message or Wi-Fi preamble/NAV.

According to some embodiments, the manner in which the wireless medium is occupied until the next possible start time for communicating in the cellular communication system is selected further based at least in part on whether an intended recipient of the cellular communication supports a request-to-send (RTS)/clear-to-send (CTS) handshake procedure.

According to some embodiments, the next possible start time for communicating in the cellular communication system comprises a next subframe according to the timing synchronization scheme for the cellular communication system.

According to some embodiments, the next possible start time for communicating in the cellular communication system comprises a next timeslot according to the timing synchronization scheme for the cellular communication system.

Another set of embodiments may include a method, comprising: by a wireless device: performing a listen-before-talk (LBT) procedure to determine whether a wireless medium is available; determining an amount of time between successful completion of the LBT procedure and a next possible start time for license assisted access (LAA) communication; determining a manner in which to occupy the wireless medium between the successful completion of the LBT procedure and the next possible start time for LAA communication on the wireless medium based at least in part on the amount of time between the successful completion of the LBT procedure and the next possible start time for LAA communication on the wireless medium; occupying the wireless medium between the successful completion of the LBT procedure and the next possible start time for LAA communication in the determined manner; and performing LAA communication on the wireless medium at the next possible start time for LAA communication.

According to some embodiments, if the amount of time between successful completion of the LBT procedure and the next possible start time for LAA communication is at least equal to an amount of time to transmit a request-to-send (RTS) message and receive a clear-to-send (CTS) message with an interframe space between, the determined manner comprises: transmitting a RTS message; and receiving a CTS message.

According to some embodiments, if the amount of time between successful completion of the LBT procedure and the next possible start time for LAA communication is greater than the amount of time to transmit a RTS message and receive a CTS message with an interframe space between, the determined manner further comprises: transmitting a reservation signal until the amount of time remaining until the next possible start time for LAA communication is equal to the amount of time to transmit a RTS message and receive a CTS message with an interframe space between.

According to some embodiments, if the amount of time between successful completion of the LBT procedure and the next possible start time for LAA communication is less than the amount of time to transmit a request-to-send (RTS) message and receive a clear-to-send (CTS) message with an interframe space between, but at least equal to an amount of time to transmit a CTS-to-self or Wi-Fi preamble/NAV message, the determined manner comprises: transmitting a CTS-to-self or Wi-Fi preamble/NAV message.

According to some embodiments, if the amount of time between successful completion of the LBT procedure and the next possible start time for LAA communication is less than the amount of time to transmit a RTS message and receive a CTS message with an interframe space between, but greater than the amount of time to transmit a CTS-to-self or Wi-Fi preamble/NAV message, the determined manner further comprises: transmitting a reservation signal until the amount of time remaining until the next possible start time for LAA communication is equal to the amount of time to transmit a CTS-to-self or Wi-Fi preamble/NAV message.

According to some embodiments, if the amount of time between successful completion of the LBT procedure and the next possible start time for LAA communication is less than the amount of time to transmit a CTS-to-self message or Wi-Fi preamble/NAV, the determined manner comprises: transmitting a reservation signal until the next possible start time for LAA communication.

According to some embodiments, the next possible start time for LAA communication comprises one or more of: a next subframe according to an LAA timing synchronization scheme, or a next timeslot according to the LAA timing synchronization scheme.

Yet another set of embodiments may include a wireless device, comprising: an antenna; a radio operably coupled to the antenna; and a processing element operably coupled to the radio; wherein the antenna, radio, and processing element are configured to: perform a listen-before-talk (LBT) procedure to determine whether a wireless medium is available; determine an amount of time between successful completion of the LBT procedure and a next subframe start time for license assisted access (LAA) communication; and transmit a request-to-send (RTS) message prior to the next subframe start time for LAA communication based at least in part on the amount of time between successful completion of the LBT procedure and the next subframe start time being above a first predetermined threshold, wherein a RTS message is not transmitted if the amount of time between successful completion of the LBT procedure and the next subframe start time is below the first predetermined threshold.

According to some embodiments, the antenna, radio, and processing element are further configured to: determine whether an intended recipient of the LAA communication supports signaling of clear-to-send (CTS) messages; and transmit the RTS message prior to the next subframe start time for LAA communication further based at least in part on the intended recipient of the LAA communication supporting signaling of CTS messages, wherein a RTS message is not transmitted if the intended recipient of the LAA communication does not support signaling of CTS messages.

According to some embodiments, the antenna, radio, and processing element are further configured to: receive a clear-to-send message from an intended recipient of the LAA communication in response to the RTS message between successful completion of the LBT procedure and the next subframe start time for LAA communication.

According to some embodiments, the antenna, radio, and processing element are further configured to: transmit a clear-to-send (CTS)-to-self or Wi-Fi preamble/NAV message prior to the next subframe start time for LAA communication based at least in part on the amount of time between successful completion of the LBT procedure and the next subframe start time being below the first predetermined threshold and above a second predetermined threshold, wherein a CTS-to-self or Wi-Fi preamble/NAV message is not transmitted if the amount of time between successful completion of the LBT procedure and the next subframe start time is below the second predetermined threshold.

According to some embodiments, the wireless device comprises a cellular base station.

A further exemplary set of embodiments may include a non-transitory computer accessible memory medium comprising program instructions which, when executed at a device, cause the device to implement any or all parts of any of the preceding examples.

A still further exemplary set of embodiments may include a computer program comprising instructions for performing any or all parts of any of the preceding examples.

Yet another exemplary set of embodiments may include an apparatus comprising means for performing any or all of the elements of any of the preceding examples.

Embodiments of the present invention may be realized in any of various forms. For example, in some embodiments, the present invention may be realized as a computer-implemented method, a computer-readable memory medium, or a computer system. In other embodiments, the present invention may be realized using one or more custom-designed hardware devices such as ASICs. In other embodiments, the present invention may be realized using one or more programmable hardware elements such as FPGAs.

In some embodiments, a non-transitory computer-readable memory medium (e.g., a non-transitory memory element) may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a UE) may be configured to include a processor (or a set of processors) and a memory medium (or memory element), where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

The invention claimed is:

1. An apparatus, comprising:
a processing element configured to cause a wireless device to:
perform a listen-before-talk (LBT) procedure to determine whether a wireless medium is available, wherein the wireless medium comprises unlicensed spectrum;
in response to determining that the wireless medium is available, determine, when the LBT procedure is complete, an amount of time until a next possible start time for communicating in a cellular communication system according to a timing synchronization scheme for the cellular communication system;
occupy the wireless medium until the next possible start time for communicating in the cellular communication system using a technique selected from a plurality of possible techniques based at least in part on the amount of time until the next possible start time for communicating in the cellular communication system; and perform cellular communication on the wireless medium at the next possible start time for communicating in the cellular communication system.

2. The apparatus of claim 1,
wherein the wireless medium is occupied until the next possible start time for communicating in the cellular communication system by one or more of:
a request-to-send (RTS)/clear-to-send (CTS) handshake procedure;
a CTS-to-self message;
a Wi-Fi preamble/NAV; or
a reservation signal.

3. The apparatus of claim 2,
wherein the wireless medium is occupied until the next possible start time for communicating in the cellular communication system by at least a RTS/CTS handshake procedure in response to a determination that the amount of time until the next possible start time for LAA communication is greater than an estimated amount of time to complete the RTS/CTS handshake procedure.

4. The apparatus of claim 2,
wherein the wireless medium is occupied until the next possible start time for communicating in the cellular communication system by at least a CTS-to-self or Wi-Fi preamble/NAV message in response to a determination that the amount of time until the next possible start time for communicating in the cellular communication system is greater than an estimated amount of time to transmit the CTS-to-self or Wi-Fi preamble/NAV message and less than an estimated amount of time to complete a RTS/CTS handshake procedure.

5. The apparatus of claim 2,
wherein the wireless medium is occupied until the next possible start time for communicating in the cellular communication system by a reservation signal and is not occupied by a RTS/CTS handshake procedure or CTS-to-self or Wi-Fi preamble/NAV message in response to a determination that the amount of time until the next possible start time for communicating in the cellular communication system is less than an estimated amount of time to complete the RTS/CTS handshake procedure or transmit the CTS-to-self message or Wi-Fi preamble/NAV.

6. The apparatus of claim 1,
wherein the technique with which the wireless medium is occupied until the next possible start time for communicating in the cellular communication system is selected further based at least in part on whether an intended recipient of the cellular communication supports a request-to-send (RTS)/clear-to-send (CTS) handshake procedure.

7. The apparatus of claim 1,
wherein the next possible start time for communicating in the cellular communication system comprises a next subframe according to the timing synchronization scheme for the cellular communication system.

8. The apparatus of claim 1,
wherein the next possible start time for communicating in the cellular communication system comprises a next timeslot according to the timing synchronization scheme for the cellular communication system.

9. A method, comprising:
by a wireless device:
performing a listen-before-talk (LBT) procedure to determine whether a wireless medium is available;
determining an amount of time between successful completion of the LBT procedure and a next possible start time for license assisted access (LAA) communication;
determining a technique, selected from a plurality of possible techniques, by manner in which to occupy the wireless medium between the successful completion of the LBT procedure and the next possible start time for LAA communication on the wireless medium based at least in part on the amount of time between the successful completion of the LBT procedure and the next possible start time for LAA communication on the wireless medium;
occupying the wireless medium between the successful completion of the LBT procedure and the next possible start time for LAA communication according to the determined technique; and
performing LAA communication on the wireless medium at the next possible start time for LAA communication.

10. The method of claim 9,
wherein if the amount of time between successful completion of the LBT procedure and the next possible start time for LAA communication is at least equal to an amount of time to transmit a request-to-send (RTS) message and receive a clear-to-send (CTS) message with an interframe space between, the determined technique comprises:
transmitting a RTS message; and
receiving a CTS message.

11. The method of claim 10,
wherein if the amount of time between successful completion of the LBT procedure and the next possible start time for LAA communication is greater than the amount of time to transmit a RTS message and receive a CTS message with an interframe space between, the determined technique further comprises:
transmitting a reservation signal until the amount of time remaining until the next possible start time for LAA communication is equal to the amount of time to transmit a RTS message and receive a CTS message with an interframe space between.

12. The method of claim 9,
wherein if the amount of time between successful completion of the LBT procedure and the next possible start time for LAA communication is less than the amount of time to transmit a request-to-send (RTS) message and receive a clear-to-send (CTS) message with an interframe space between, but at least equal to an amount of time to transmit a CTS-to-self or Wi-Fi preamble/NAV message, the determined technique comprises:
transmitting a CTS-to-self or Wi-Fi preamble/NAV message.

13. The method of claim 12,
wherein if the amount of time between successful completion of the LBT procedure and the next possible start time for LAA communication is less than the amount of time to transmit a RTS message and receive a CTS message with an interframe space between, but greater than the amount of time to transmit a CTS-to-self or Wi-Fi preamble/NAV message, the determined technique further comprises:
transmitting a reservation signal until the amount of time remaining until the next possible start time for LAA communication is equal to the amount of time to transmit a CTS-to-self or Wi-Fi preamble/NAV message.

14. The method of claim 9,
wherein if the amount of time between successful completion of the LBT procedure and the next possible start time for LAA communication is less than the amount of time to transmit a CTS-to-self or Wi-Fi preamble/NAV message, the determined technique comprises:
transmitting a reservation signal until the next possible start time for LAA communication.

15. The method of claim 9,
wherein the next possible start time for LAA communication comprises one or more of:
a next subframe according to an LAA timing synchronization scheme, or
a next timeslot according to the LAA timing synchronization scheme.

16. A wireless device, comprising:
an antenna;
a radio operably coupled to the antenna; and
a processing element operably coupled to the radio;
wherein the antenna, radio, and processing element are configured to:
 perform a listen-before-talk (LBT) procedure to determine that a wireless medium is available;
 determine an amount of time between successful completion of the LBT procedure and a next subframe start time for license assisted access (LAA) communication; and
 transmit a request-to-send (RTS) message prior to the next subframe start time for LAA communication based at least in part on the amount of time between successful completion of the LBT procedure and the next subframe start time being above a first predetermined threshold,
 wherein a RTS message is not transmitted when the amount of time between successful completion of the LBT procedure and the next subframe start time is below the first predetermined threshold.

17. The wireless device of claim 16,
wherein the antenna, radio, and processing element are further configured to:
determine whether an intended recipient of the LAA communication supports signaling of clear-to-send (CTS) messages; and
transmit the RTS message prior to the next subframe start time for LAA communication further based at least in part on the intended recipient of the LAA communication supporting signaling of CTS messages,
wherein a RTS message is not transmitted if the intended recipient of the LAA communication does not support signaling of CTS messages.

18. The wireless device of claim 16,
wherein the antenna, radio, and processing element are further configured to:
receive a clear-to-send message from an intended recipient of the LAA communication in response to the RTS message between successful completion of the LBT procedure and the next subframe start time for LAA communication.

19. The wireless device of claim 16,
wherein the antenna, radio, and processing element are further configured to:
transmit a clear-to-send (CTS)-to-self or Wi-Fi preamble/NAV message prior to the next subframe start time for LAA communication based at least in part on the amount of time between successful completion of the LBT procedure and the next subframe start time being below the first predetermined threshold and above a second predetermined threshold,
wherein a CTS-to-self or Wi-Fi preamble/NAV message is not transmitted if the amount of time between successful completion of the LBT procedure and the next subframe start time is below the second predetermined threshold.

20. The wireless device of claim 16,
wherein the wireless device comprises a cellular base station.

* * * * *